April 7, 1970 R. KOBLER ETAL 3,504,449
DEVICE FOR TEACHING ARITHMETIC
Filed March 29, 1968 2 Sheets-Sheet 1
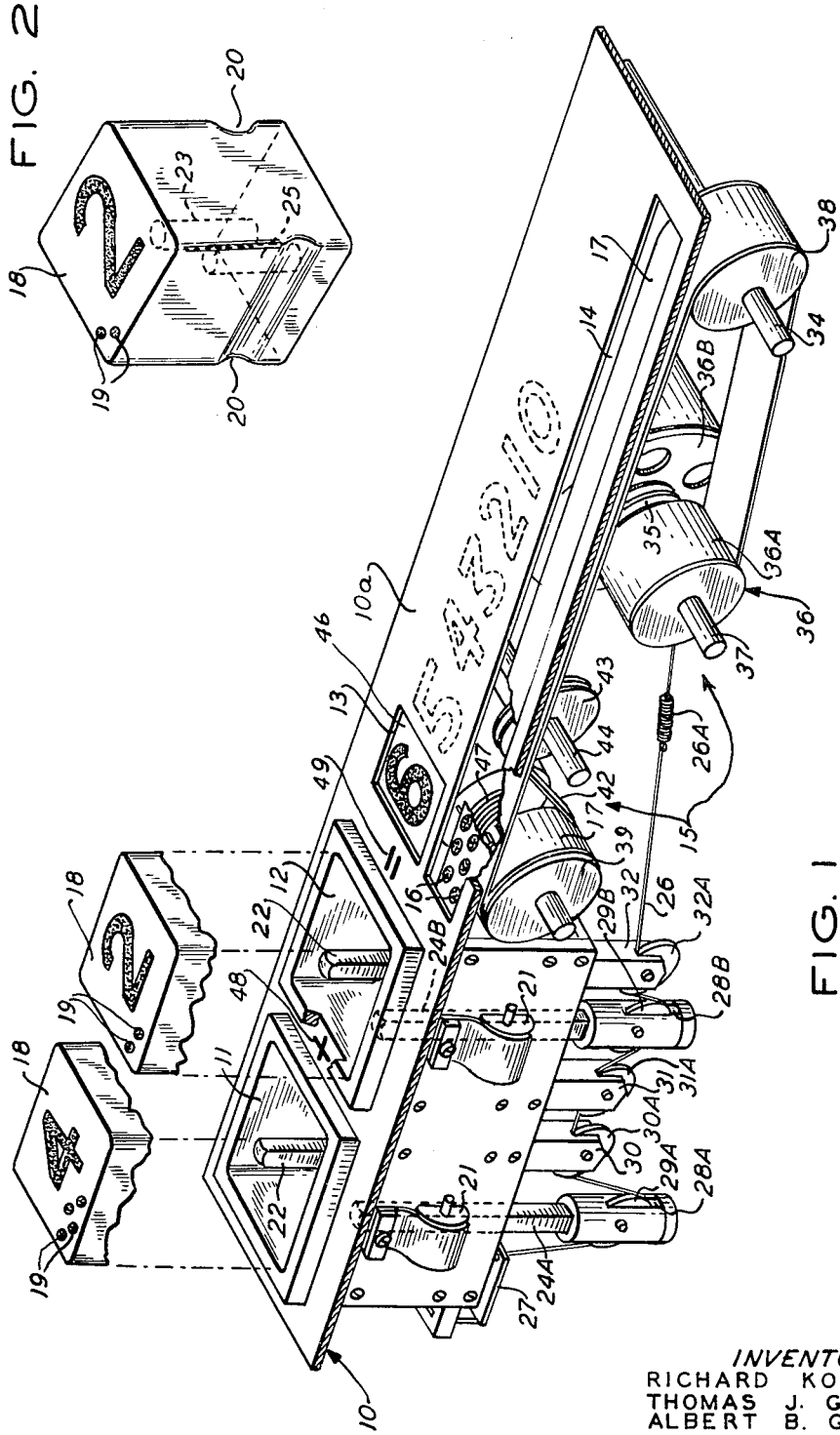
*INVENTORS*
RICHARD KOBLER
THOMAS J. GAVEN
ALBERT B. GLOOR
BY George H. Fritzinger
AGENT April 7, 1970 — R. KOBLER ET AL — 3,504,449
DEVICE FOR TEACHING ARITHMETIC
Filed March 29, 1968 — 2 Sheets-Sheet 2
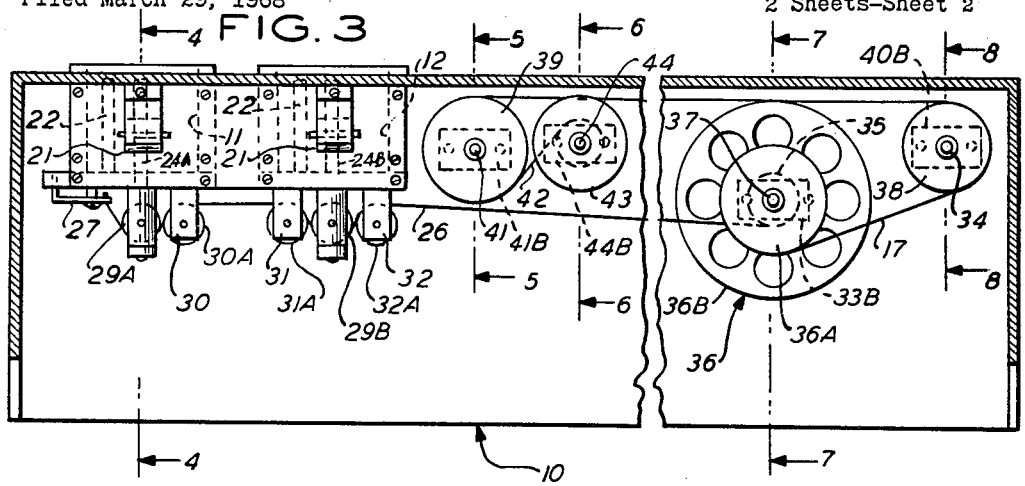
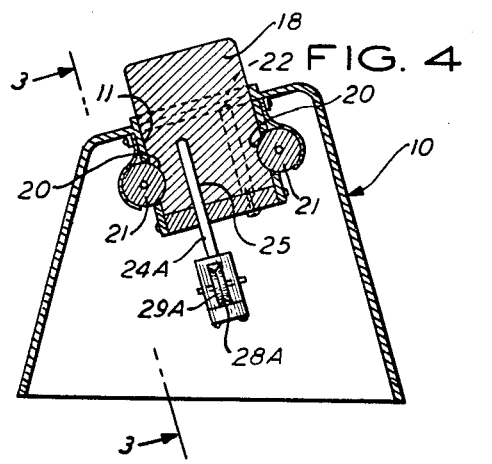
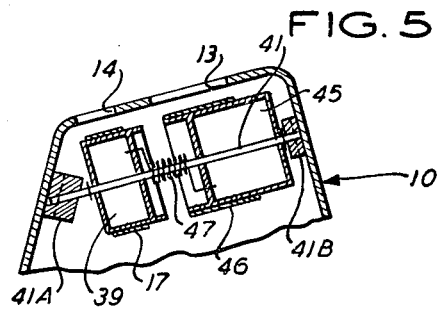
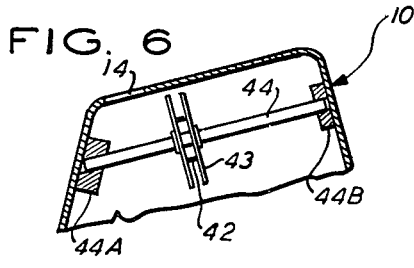
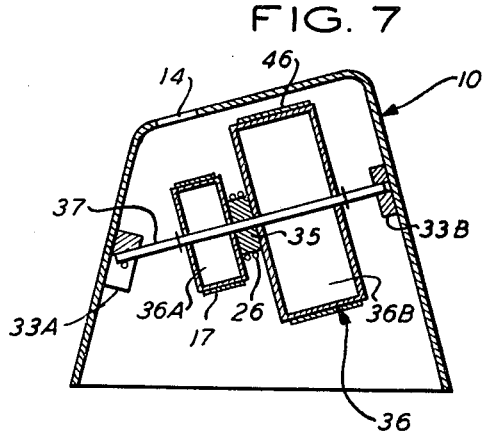
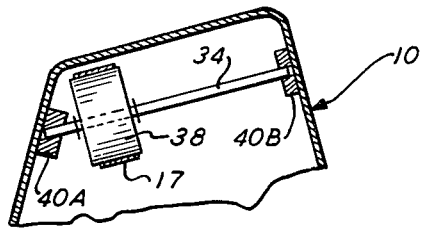
INVENTORS
RICHARD KOBLER
THOMAS J. GAVEN
ALBERT B. GLOOR
BY George H. Fritzinger
AGENT

UNITED STATES PATENT OFFICE

United States Patent Office 3,504,449
Patented Apr. 7, 1970

3,504,449
DEVICE FOR TEACHING ARITHMETIC
Richard Kobler, West Orange, Thomas J. Gaven, Livingston, and Albert B. Gloor, Ringwood, N.J., assignors to McGraw-Edison Company, Elgin, Ill., a corporation of Delaware
Filed Mar. 29, 1968, Ser. No. 717,220
Int. Cl. G09b 19/02
U.S. Cl. 35—31     12 Claims

ABSTRACT OF THE DISCLOSURE

A device for teaching arithmetic to children comprises a plurality of recesses for receiving individual blocks. The blocks have numbers and as many dots as the respective numbers imprinted on their top faces. The bottom portions of the blocks are shaped to operate plungers within the recesses to an extent in correspondence with the numbers on the respective blocks as the blocks are inserted into the recesses. The plungers actuate a register to show the number on the block when a block is inserted into a recess and to show the sum of the numbers on the blocks when a plurality of blocks are inserted into respective recesses or sockets. Also, the register includes a tape bearing a series of dots which is moved along an elongate window to show as many dots as the number of dots on the block or blocks inserted in the recesses. As the blocks are removed individually the numbers and quantities of dots are decreased to show the process of subtraction. In this way a child is taught the quantitative significance of pure numbers and the addition and subtraction of pure numbers as well as the addition and subtraction of quantities.

---

An object of the invention is to provide a novel teaching device which is adapted to teach children automatically the significance of pure numbers, the addition and subtraction of pure numbers and quantities, and the concept of equating numbers to each other.

Another object is to provide such teaching device which has the aspects of a toy to entice the interest of children to hold their interest over sustained periods.

Another object is to provide such teaching device which is of a novel and economical construction.

These and other objects and features of the invention will be apparent from the following description and the appended claims.

In the description of our invention reference is had to the acompanying drawings, of which:

FIGURE 1 is a perspective view of the present teaching device showing the housing side walls cutaway and showing the machine in the operated state it would have were the two fractionally shown blocks pressed down into mounted positions;

FIGURE 2 is a perspective view of one of the blocks;

FIGURE 3 is a fractional side view of the teaching device taken from the line 3—3 of FIGURE 4 but shown in an unactuated condition;

FIGURES 4–8 are fractional vertical sectional views taken respectively from the lines 4—4, 5—5, 6—6, 7—7 and 8—8 of FIGURE 3.

The present teaching device has a housing frame 10 of an elongated shape. In the top wall 10a of the housing there is a plurality of recesses or sockets in line from left to right of which two recesses 11 and 12 are shown by way of example. Directly to the right of the recess 12 is a rectangular display window 13 and below the window 13 is an elongate display window 14 which extends to the right end of the housing. Numbers of a register 15 are shown through the window 13, and as many dots 16 as the number in the window 13 are shown on a tape 17 via the window 14.

A group of blocks 18 preferably of wood and of the usual toy variety is provided with each teaching device. Typically, as many sets of blocks are provided as the number of recesses in the device. Each set of blocks may comprise 11 blocks numbered on the top faces from 0 through 10. Also on the top face of each block there are a number of dots 19 corresponding to the respective number on the block. The blocks are adapted to be inserted individually into the recesses 11 and 12 in upright positions. The side walls of the blocks have lateral recesses 20 near the bottom which are engaged by spring-pressed rollers 21 to detent the blocks in their inmost positions. Upstanding from the bottom walls of the recesses are fixed guide posts 22 in off-center positions and in the bottom walls of the blocks are corresponding holes 23 to require inserting the blocks only in their upright positions and in an orientation which permits reading the numbers on the blocks from the front of the teaching device. Also upstanding from the bottom walls of the recesses are depressible plunger rods 24A and 24B which are received by corresponding holes 25 in the bottom walls of the blocks. The hole 25 in each block is of such depth as to enforce a depression of the respective plunger by a distance corresponding to the number on the block as the block is inserted into the recess. This is accomplished by making the holes 25 of depths which are in inverse relation to the numbers on the blocks.

The plungers 24A and 24B actuate the register through a cord 26. The cord is attached to a fixed bracket 27 at the left end of the device and is threaded through slots 28A and 28B in the lower portions of the plungers 24A and 24B in the respective recesses 11 and 12. Grooved pulleys 29A and 29B are journaled on the plungers in the slots. Immediately to the right of the first plunger 24A is a depending post 30 slotted at its lower end and journaled in the slot on the post is a grooved guide pulley 30A. Immediately to the left and right of the second plunger 24B are depending posts 31 and 32 similar to the post 29 in which are journaled grooved guide pulleys 31A and 32A. The cord 26 is lead across the bottom of the grooved pulleys 29A and 29B in the plungers 24A and 24B and across the tops of the fixed guide pulleys 30A, 31A and 32A. From the right guide pulley 32A the cord leads to and is wound on a central hub 35 of a double take-up drum 36 of the register 15. The drum 36 comprises a smaller drum section 36A and a larger drum section 36B at opposite sides of the hub 35. The drum 36 is journaled on a shaft 37 secured at the ends in brackets 33A and 33B on the side walls of the housing. A spring 36A in the cord 26 is provided to avoid shock forces from being transmitted to the register 15 should a block be driven suddenly as with a hammer-like blow into one of the recesses 11 or 12.

The tape 17 aforementioned is wound onto the smaller take-up drum section 36A from around an idler roller 38 at the right end of the elongate window 14 and from a supply drum 39 at the left end of this window. The idler roller is journaled on a shaft 34 secured at its ends in brackets 40A and 40B in the side walls of the housing and the supply drum 39 is journaled on a shaft 41 secured at its ends in brackets 41A and 41B in the side walls of the housing. The portion of the tape 17 stored on the drum 39 when the device is in a free or unactuated state has thereon a series of dots 16 as indicated in FIGURE 1. The leader portion of the tape extending from the supply drum 39 throughout the length of the window 14 and then around the idler roller 38 to the take-up drum section 36A has a plain surface without any marks.

A spring 42 preferably of a constant force type is stored on a reel 43 having a shaft 44 journaled in brackets 44A and 44B in the side walls of the housing. The spring 42 is unwound from the reel 43 and wound onto the inner end portion of the supply drum 39 as the tape 17 is drawn from the supply drum. The bias torque so produced by the spring 42 on the supply drum 39 places a constant tension on the tape 17 which in turn places a constant tension on the cord 26 to keep the cord taut and in engagement with the guide pulleys associated with the plungers 24A and 24B. Still further, this tensioning of the cord 26 serves to bias the plungers 24A and 24B into their raised positions.

Also journaled on the shaft 41 directly below the window 13 is a large supply drum 45 for a tape 46 bearing a series of numbers from 0 to 20. The other end of this tape is wound on the take-up drum section 36B. A torsion spring 47 on the shaft 41 between the drum 39 and the drum 45 exerts a bias torque on the drum 45 from the drum 39. This bias torque serves to hold the numbered tape 46 taut. However, the bias torque exerted by the spring 47 is kept below the torque exerted by the return spring 42 on the drum 39 so that when the device is in an unactuated state the spring 47 will not overpower the spring 42 to cause the tape 17 to become slack. In the unactuated state of the device the number "0" appears in the window 13 and both plungers 24A and 24B held in their uppermost positions shown in FIGURE 3. When the plungers are in their uppermost positions, the pulley 29A on the plunger 24A is at or below the adjacent guide pulleys 31A and 32A. Since the cord 26 is threaded below the plunger pulleys 29A and 29B and over the top of the respective guide pulleys 30A, 31A and 32A, a depression of a plunger will from the start unwind the cord linearly from the hub 35 to actuate the register 15 on a linear basis in relation to the depression of the plungers. For example, if the plunger 24A is depressed, say by a 4-step distance, by inserting a No. 4 block into the recess 11, the drum section 36B is rotated to bring the numeral "4" on the tape 45 into view via the window 13. At the same time the tape 17 is unwound from the supply drum 39 to bring four of the dots 16 into view via the window 14. If while the plunger 24A is so held depressed by the detention of the No. 4 block in recess 11 the plunger 24B is depressed say by a two-step distance by inserting a No. 2 block in the recess 12, the drum section 36B is rotated further to bring the number "6" into view and at the same time the tape 17 is further unwound from the supply drum 39 to bring a total of 6 of the dots 16 into view via the window 14. The placement of as many dots on the face of the block as the number imprinted on the block, and likewise the actuation of the register 15 by inserting a block into a recess to display both the number on the block and as many dots as that number are adapted to teach a pupil a quantitative concept of pure numbers. Since the actuation of the register is additive when two blocks are inserted into the recesses, the pupil is taught not only the concept of adding pure numbers, but also the concept of adding quantities as well. Also, the physical disposition of the recesses 11 and 12 to the display window 13 is such that with the addition of a plus sign 48 between the recesses and an equal sign 49 between the recess 12 and the display window 13 the pupil is taught the concept of equating numbers in an equation form.

When one of the two blocks is removed the number displayed by the register is reduced by the number on the block so removed, and the number of dots 16 displayed via the window 14 is reduced by that number to teach the concepts of subtracting pure numbers and of quantities.

The embodiment of our invention herein particularly shown and described is intended to be illustrative and not necessarily limitative of our invention since the same is subject to changes and modifications without departure from the scope of our invention, which we endeavor to express according to the following claims. For example, in construing the claims the term "block" may be any solid piece of wood, metal or other material with one plane surface or more.

We claim:

1. A teaching device comprising a set of blocks having numbers thereon, a plurality of sockets each adapted for receiving one of said respective blocks, each of said blocks having a portion removably engageable with respective sockets, said portion of each block having a slot dimensioned in relation to the number on the block, a register in said device progressively actuatable for showing successive numbers, and means associated with said sockets and engageable with said slot of a block as the block is mounted in one of said sockets for actuating said register to an extent according to the number on the block whereby to cause the register to show said number.

2. The teaching device set forth in claim 1 wherein the respective actuating means for said register at said sockets are coupled additively whereby when a plurality of blocks are mounted in said sockets said register will show the sum of the numbers on said blocks.

3. The teaching device set forth in claim 1 including a housing having an elongate opening, a tape in said housing trained to have a run along said opening, said tape having a portion provided with a series of dots of a number equal to the maximum sum of the numbers on the blocks mountable on said support means, and drive means for said tape coupled to said register to advance the tape to bring into view via said elongate opening as many dots as the number shown by said register when one or more blocks are mounted in said sockets.

4. A teaching device comprising a housing having recesses for receiving individual blocks with numbers imprinted on the top faces thereof, said recesses and blocks having cooperative means associated therewith to enable said blocks to be mounted only in upright positions and in a given angular orientation with respect to the housing, each of said blocks having a recess of a dimension proportional to the number on the block, a register in said housing progressively actuatable for showing successive numbers at one viewing area and for showing equal quantities at another viewing area, and for showing equal quantities at another viewing area, and means in the recesses in said housing engageable with said recesses in said blocks as the blocks are mounted in the housing for actuating said register to show the sum of the numbers on the blocks in said housing recesses at said first viewing area and to show a quantity equal to the sum of said numbers at said other viewing area.

5. The educational device set forth in claim 4 wherein said housing recesses and said one viewing area are arranged in a row along said housing, and wherein a plus sign is located between said recesses and an equal sign is located between the last of said recesses and said one viewing area to convey the concept of an equation.

6. The teaching device set forth in claim 4 including an elongate opening in said housing, and a tape included in said register and moved along said opening in proportion to the sum of the numbers on the blocks inserted in said housing recesses, said tape bearing a succession of dots to expose to view a number of said dots equal to the number shown by said register.

7. The teaching device set forth in claim 4 wherein the recesses in said blocks are holes extending from the bottom faces thereof through distances inversely proportional to the numbers on the respective blocks, and wherein said actuating means comprises spring urged plungers extending upwardly from the bottoms of the recesses in said housing, said plungers being engageable with said holes in said blocks for depressing the plungers by amounts proportional to the numbers on the blocks as the blocks are pressed into the housing recesses.

8. The teaching device set forth in claim 4 including spring operated detent means in said housing recesses cooperable with said blocks for holding the blocks releasably in place against ejection by said actuating means.

9. A teaching device for teaching arithmetic comprising an assortment of blocks marked from 0 to 10, a housing having a plurality of recesses in its top wall for receiving respective blocks, a window with means for showing numbers, and an elongate opening with a tape along the length thereof movable to bring into view as many dots as the number shown via said window, a plunger upstanding from the bottom of each of said recesses depressible to actuate said register, each of said blocks having a hole in the bottom face thereof received by the plunger in the housing recess when a block is inserted thereinto, said holes being of variable depth according to the numbers on the blocks so that when a block is inserted into one of said housing recesses the plunger is depressed to an extent proportional to the number on the block and said register is actuated to show the number on the block and said tape is moved to show as many dots as said number, and means coupling said plungers in a series relationship whereby when a plurality of blocks are inserted into said housing recesses the register is actuated to show the sum of the numbers on said blocks and said tape is moved to show a number of said dots equal to said sum.

10. A device for teaching arithmetic comprising a housing having a plurality of rectangular recesses respectively adapted for receiving individual blocks, spring pressed plungers upstanding from the bottoms of said recesses, said blocks having numbers imprinted on the top faces thereof and holes in the bottom faces of depths depending on the numbers on the respective blocks whereby to cause the plungers to be depressed by distances depending on the numbers on the respective blocks as the blocks are inserted into said recesses, means for detenting the blocks in said recesses, a register biased to zero position, a cord connected at one end to said housing and at the other end to said register with the run of the cord leading past the lower ends of said plungers, said guide rollers below said cord at the sides of said plungers for causing lengths of the cord to be drawn from said register proportionately to the distances by which said plungers are depressed by said blocks whereby said register is actuated to indicate the sum of the numbers on the blocks inserted into said recesses.

11. A teaching device comprising a set of blocks having numbers printed thereon, a socket for receiving one of said respective blocks, each of said blocks having a portion removably engageable with said socket, said portion of each block having a slot dimensioned in relation to the number of the block, a register in said device progressively actuatable to show increasing numbers of items of a predetermined character, and means associated with said socket and engageable with said slot of a block as the block is mounted in said slot for actuating said register to show as many of said items as the number on said block.

12. The teaching device set forth in claim 11 wherein each of said blocks is imprinted with a number of said items equal to the number on the block, and said device includes a plurality of said sockets and respective actuating means with the actuating means coupled additively to cause the register to show as many items as the sum of the numbers on the blocks mounted in said sockets.

References Cited
UNITED STATES PATENTS 1,950,072  3/1934  Townsend _____ 35—31
2,453,265  11/1948  Robinson _____ 35—9.1

EUGENE R. CAPOZIO, Primary Examiner

W. H. GRIEB, Assistant Examiner

U.S. Cl. X.R.
35—31